(12) United States Patent
Suzuki

(10) Patent No.: US 7,896,119 B2
(45) Date of Patent: Mar. 1, 2011

(54) SHIFT PEDAL MEMBER FOR A VEHICLE

(75) Inventor: Tomoichirou Suzuki, Shizuoka (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 176 days.

(21) Appl. No.: 12/155,178

(22) Filed: May 30, 2008

(65) Prior Publication Data

US 2008/0295641 A1 Dec. 4, 2008

(30) Foreign Application Priority Data

May 30, 2007 (JP) ............................. 2007-142942

(51) Int. Cl.
*B62M 25/06* (2006.01)

(52) U.S. Cl. ...................... 180/230; 180/293; 180/336; 180/219; 280/291

(58) Field of Classification Search ................ 180/230, 180/293, 336, 219; 280/291
See application file for complete search history.

(56) References Cited

U.S. PATENT DOCUMENTS

| | | | | | |
|---|---|---|---|---|---|
| 5,211,256 | A | * | 5/1993 | Muramatsu | 180/219 |
| 5,661,999 | A | * | 9/1997 | Carone | 74/473.16 |
| 6,308,797 | B1 | * | 10/2001 | Hacker et al. | 180/230 |
| 7,044,254 | B2 | * | 5/2006 | Graziano | 180/219 |
| 7,467,682 | B1 | * | 12/2008 | Hahm | 180/230 |
| 7,575,083 | B2 | * | 8/2009 | Kosugi et al. | 180/219 |

FOREIGN PATENT DOCUMENTS

JP  2006-315478  11/2006

* cited by examiner

*Primary Examiner*—Lesley D. Morris
*Assistant Examiner*—Marlon A Arce
(74) *Attorney, Agent, or Firm*—Rabin & Berdo, PC

(57) ABSTRACT

A vehicle includes an engine. The engine includes a deceleration mechanism inside a crankcase part. A shift pedal member for actuating the deceleration mechanism of the engine is provided. An arm member has a lower part directly mounted on the shift pedal member. A link member is rotatably connected to an upper part of the arm member and connected to the deceleration mechanism of the engine.

19 Claims, 14 Drawing Sheets

SHIFT PEDAL MEMBER FOR A VEHICLE

BACKGROUND OF THE INVENTION

1. Technical Field

The present invention relates to a vehicle, for example a motorcycle, and in particular to a vehicle including a shift pedal member.

2. Background Art

A vehicle, such as a motorcycle, having a shift pedal is known. For example, Japanese Patent Document JP-A-2006-315478 discloses a shift pedal system for a motorcycle. The shift pedal system includes a shift pedal for actuating a deceleration mechanism via a link connected to the deceleration mechanism. An arm is operated together with the shift pedal for transmitting an operation of the shift pedal to the link. A shift pedal rotating shaft is provided that extends in a vehicle width direction between the shift pedal and the arm for transmitting the operation of the shift pedal to the arm. In this known shift pedal system, since the shift pedal rotating shaft is disposed between the shift pedal and the arm, and due to the length of the shift pedal rotating shaft, the shift pedal is caused to stick out in the vehicle width direction.

SUMMARY OF THE INVENTION

An object of the present invention is to provide a vehicle which improves the steering characteristics of the vehicle in a turn.

To achieve the above and other objects, one aspect of the present invention includes providing a vehicle having an engine including a deceleration mechanism inside a crankcase; a shift pedal member for actuating the deceleration mechanism of the engine; an arm member having one end directly mounted on the shift pedal member; and a link member rotatably connected to the other end of the arm member and connected to the deceleration mechanism of the engine.

As described above, the vehicle in accordance with the above description has the shift pedal member for actuating the deceleration mechanism of the engine and the arm member of which one end is directly mounted on the shift pedal member. Thereby, the arm member is directly mounted on the shift pedal member, and thus a distance between an outside part of the shift pedal member and an outside part of the arm member can be made shorter by the length omitted due to the direct mounting. This can prevent the portion of the shift pedal member mounted on the arm member from largely overhanging outward in the vehicle width direction. As a result, the vehicle can be tilted more closely to the ground when turning the vehicle. Accordingly, steering characteristics in a turn are improved.

In the vehicle in accordance with the present invention, the shift pedal member may include a main body and a pedal rotating shaft mounted on the main body, with the arm member being mounted on a part of the shift pedal member in a vicinity of the pedal rotating shaft. With such a construction, the arm member can be facilely rotated together with rotation of the shift pedal member.

The arm member may be mounted on a part of the shift pedal member in a vicinity of the pedal rotating shaft. Further, the shift pedal member may include a pedal part, mounted on a part of the main body opposite to a part thereof on which the pedal rotating shaft is mounted, to protrude outward in the vehicle width direction. Moreover, the main body of the shift pedal member may be constructed in a manner such that the part of the main body on which the pedal part is mounted inclines outward in the vehicle width direction relative to the part of the main body on which the pedal rotating shaft is mounted. With such a construction, it is possible to prevent the part of the main body on which the pedal rotating shaft is mounted, which is normally positioned at a lower part of the shift pedal member, from largely overhanging outward in the vehicle width direction. This prevents the lower part of the shift pedal member from contacting with the ground when the vehicle is tilted.

In another exemplary aspect of the invention, the vehicle may include a shift pedal member constructed in a manner such that the part of the main body on which the pedal part is mounted inclines outward in the vehicle width direction relative to the part of the main body on which the pedal rotating shaft is mounted. Further, the vehicle may also include: a mainframe on which the engine is mounted; and a bracket mounted on the mainframe, and the main body of the shift pedal member is constructed in a manner such that a surface of the main body positioned outside in the vehicle width direction, and vicinal to the part of the main body on which the pedal rotating shaft is mounted, is disposed to face a surface of the bracket positioned inside in the vehicle width direction. Moreover, a surface of the main body positioned outside in the vehicle width direction, and vicinal to the part of the main body on which the pedal part is mounted, may be disposed more outward than a surface of the bracket positioned outside in the vehicle width direction. With such a construction, in the case that the bracket is provided on the mainframe, it is possible to facilely obtain the shift pedal member of which the lower part can be prevented from largely overhanging outward in the vehicle width direction.

The shift pedal member may include the main body, and the pedal part may be mounted on its upper part and the pedal rotating shaft is mounted on its lower part. Further, one pedal part may be provided on the shift pedal member, and the deceleration mechanism of the engine may be actuated by the one pedal part. With such a construction, the number of parts can be reduced compared to a case that both a pedal part for increasing a deceleration ratio of the deceleration mechanism and a pedal part for reducing a deceleration ratio are provided.

The shift pedal member may rotate around the pedal rotating shaft. Moreover, the vehicle may further include a mainframe on which the engine is mounted; and a bracket mounted on the mainframe, and the pedal rotating shaft is directly mounted on the bracket. With such a construction, the pedal rotating shaft can be stably mounted on the bracket mounted on the mainframe. Therefore, the shift pedal member can be rotated in a stable state.

In the vehicle in accordance with the above exemplary aspects of the present invention, the arm member and the link member may be connected together at a position overlapping with the shift pedal member as seen from a side of the vehicle, and a lower end of the arm member may be bolted to the main body of the shift pedal part. With such a construction, the arm member and the shift pedal member, which overlap as seen from a side, are detachable by means of bolting. Therefore, the arm member and the link member can be connected together while the arm member and the shift pedal member are separated from each other. Thereby, a process for combining the arm member with the link member can be simplified. Further, the arm member may be bolted to the main body of the shift pedal member after combining the arm member with the link member, and thereby a process for combining the arm member with the main body of the shift pedal member can be simplified.

In the vehicle in accordance with the above exemplary aspects of the present invention, the arm member and the link member may be adjustable to extend substantially perpendicularly as seen from a side of the vehicle in a state that the shift pedal is not rotated. With such a construction, components of a force transmitted from the arm member to the link member in a connection part between the arm member and the link member can be prevented from dispersing in directions except for the axial direction of the link member when the arm member is rotated. Therefore, a force in rotation of the arm member can be effectively transmitted to the link member.

In the vehicle in accordance with the above exemplary aspects of the present invention, the vehicle may further include a crankshaft disposed inside the crankcase of the engine, and the link member may be disposed more outward in the vehicle width direction than the crankcase of the engine and above the crankshaft. With such a construction and when the link member is disposed above the crankshaft, a connection part between the link member and the deceleration mechanism can be provided above the crankcase.

DETAILED DESCRIPTION OF THE INVENTION

The invention will now be described in more detail by way of example with reference to the embodiments shown in the accompanying Figures. It should be kept in mind that the following described embodiments are only presented by way of example and should not be construed as limiting the inventive concept to any particular physical configuration.

Further, if used and unless otherwise stated, the terms "upper," "lower," "front," "back," "over," "under," and similar such terms are not to be construed as limiting the invention to a particular orientation. Instead, these terms are used only on a relative basis.

Moreover, any term of degree used herein, such as "substantially", "essentially" and "nearly", means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

The present invention is directed toward a shift pedal member of a vehicle. In the exemplary embodiment, the vehicle is a motorcycle. However, it is contemplated that the concepts of the present invention may be applied to other types of vehicles within the spirit and scope of the invention. For example, the vehicle may be any vehicle that may use a shift pedal member, such as a bicycle, a three-wheeled vehicle, or an ATV (all terrain vehicle).

Figure 1:
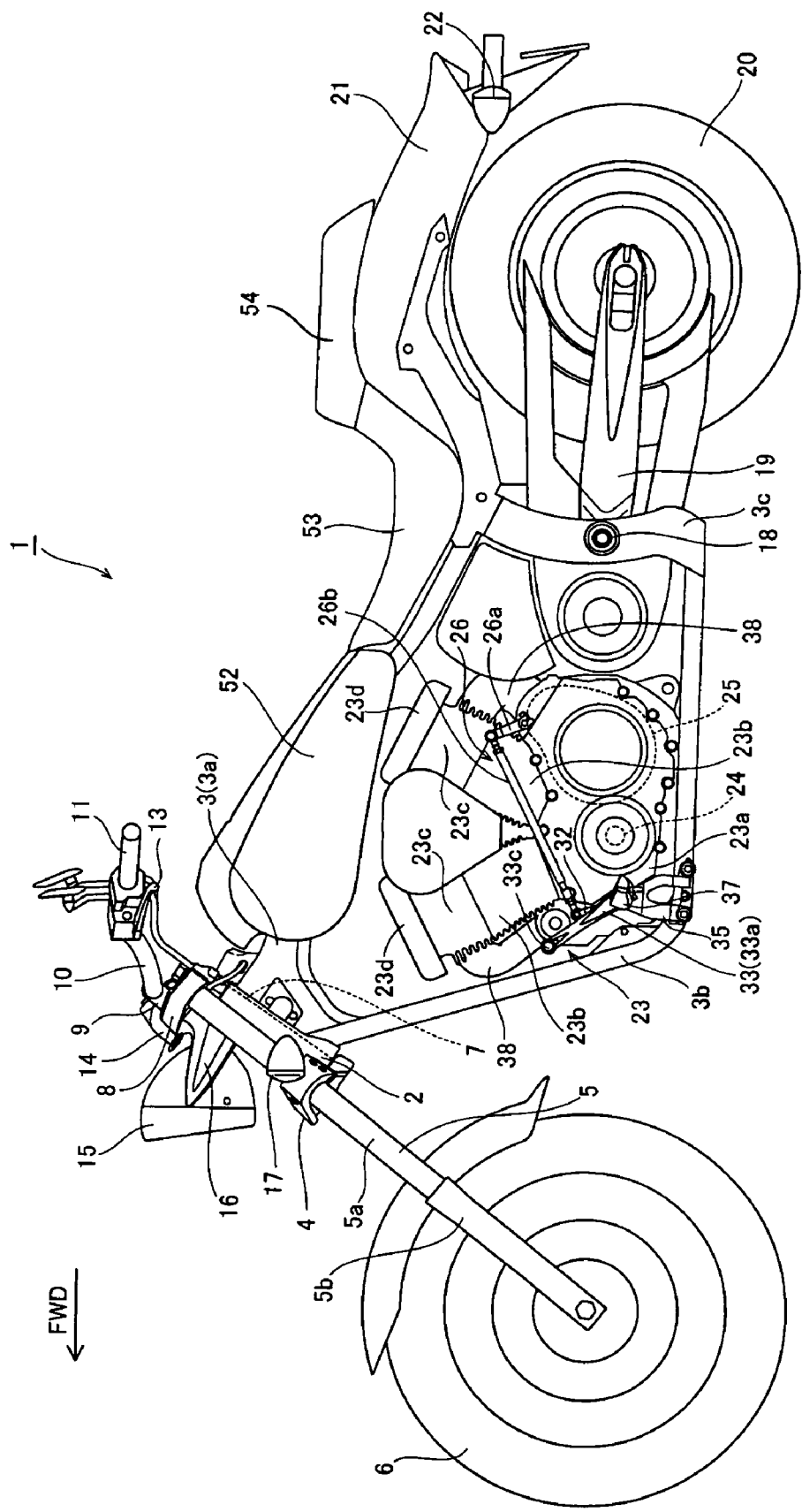
FIG. 1 is a left side view showing a general construction of a motorcycle according to one embodiment of the present invention.
Figure 2:
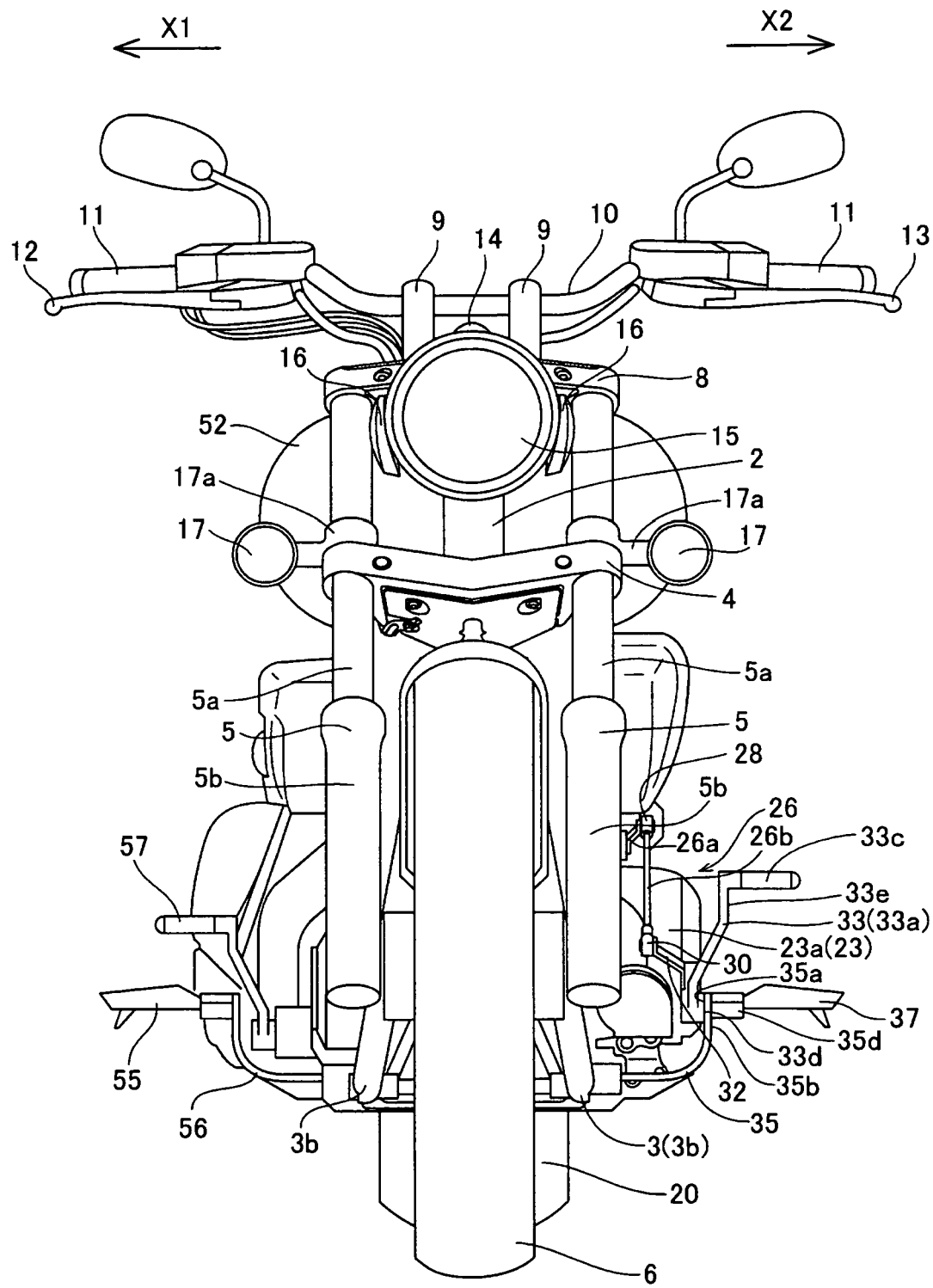
FIG. 2 is a front view of the motorcycle shown in FIG. 1.

Referring to FIG. 1, a left side view of an entire motorcycle according to one embodiment of the present invention is illustrated. In the drawings, the FWD arrow indicates a forward direction in which the vehicle runs. Any reference to a rearward direction will be taken to mean in a direction opposite to the forward direction. Further, any reference to a front and rear of the vehicle will be used in the usual and customary manner. Moreover, any reference to the width direction of the vehicle will be taken to mean in a direction perpendicular to the FWD arrow, and in the direction of the arrows X1 and X2, as shown in FIG. 2. Additionally, when reference is made to the left side of the vehicle, this is taken to mean the side viewed in the direction of the arrow X1, with the front of the vehicle being disposed on the viewer's left. The right side will be the side opposite of the left side (e.g., on the side that the arrow X2 is located).

Referring to FIG. 1, the vehicle 1, according to one aspect of the present invention, includes a mainframe 3 connected to a rear part of a head pipe 2. The mainframe 3 includes a top frame 3a extending rearward from the head pipe 2, a down tube 3b extending downward from the head pipe 2, and a rear frame 3c for connecting a rear part of the top frame 3a with a rear part of the down tube 3b. The vehicle body is comprised of the head pipe 2 and the mainframe 3.

An under bracket 4 is disposed below the head pipe 2. The under bracket 4 is rotatable relative to the head pipe 2. As shown in FIG. 2, the legs of a front fork 5 are individually mounted in vicinities of both ends of the under bracket 4 in the vehicle width direction (the direction of the arrows X1 and X2 in FIG. 2). Each leg of the front fork 5 includes an upper inner tube 5a and a lower outer tube 5b. The lower outer tube 5b is slidable along an outer periphery of the inner tube 5a. A front wheel 6 is rotatably mounted on a lower end of the outer tubes 5b. The front fork 5, on which the front wheel 6 is mounted, supports the vehicle body via the under bracket 4.

A steering shaft 7 may be fitted in the under bracket 4. The steering shaft 7 is disposed to extend upward from the under bracket 4. An upper part of the steering shaft 7 is connected to an upper bracket 8. The upper bracket 8 is disposed so that a center of the upper bracket, in the vehicle width direction, covers the head pipe 2. The inner tubes 5a may be fixed to the upper bracket 8 at their respective upper portions.

As shown in FIGS. 1 and 2, a pair of upward-protruding handlebar stays 9 may be mounted on an upper part of the upper bracket 8. A handlebar pipe 10, extending in the vehicle width direction, may be fixed to an upper part of the handlebar stays 9. As shown in FIG. 2, a grip 11 may be provided on each respective end of the handlebar pipe 10. A brake lever 12 may be provided in a vicinity of the right side grip 11. A clutch lever 13 may be provided in a vicinity of the left side grip 11.

A switch cover 14, in which a main switch (not shown) may be housed, may be mounted in front of the center of the upper bracket 8. As shown in FIGS. 1 and 2, a pair of headlight stays 16 for retaining a headlight 15 may be provided on a lower surface of the upper bracket 8.

A pair of flashing lamps 17 may be disposed near an upper part of the under bracket 4. The flashing lamps 17 may be individually mounted on the inner tubes 5a of the front fork 5 via brackets 17a (see FIG. 2).

As shown in FIG. 1, a pivot shaft 18 may be provided in the rear frame 3c of the mainframe 3. A front end of a rear arm 19 may be pivotally supported by the pivot shaft 18 so as to be swingable in a vertical direction. A rear wheel 20 may be rotatably mounted on a rear end of the rear arm 19. A rear fender 21 may be disposed above the rear wheel 20. A pair of flashing lamps 22 may be mounted on a rear part of the rear fender 21.

A crankcase, such as crankcase part 23a of an engine 23, may be mounted on the down tube 3b of the mainframe 3. The engine 23 may be, for example, an air-cooled type engine. The engine 23 may include, in addition to the crankcase part 23a, a cylinder block 23b, a cylinder head 23c, and a cylinder head cover 23d. A crankshaft 24 may be disposed in the crankcase part 23a to extend in the vehicle width direction. A piston (not shown) slides on an inner peripheral surface of the cylinder block 23b, thereby causing the crankshaft 24 to rotate. A main shaft (not shown), which rotates together with a rotation of the crankshaft 24, is disposed inside the crankcase part 23a at a rear of the crankshaft 24. The main shaft (not shown) forms a part of a deceleration mechanism 25 disposed inside the crankcase part 23a. The deceleration mechanism 25 transmits the rotation of the crankshaft 24 to the rear wheel 20.

Figure 3:
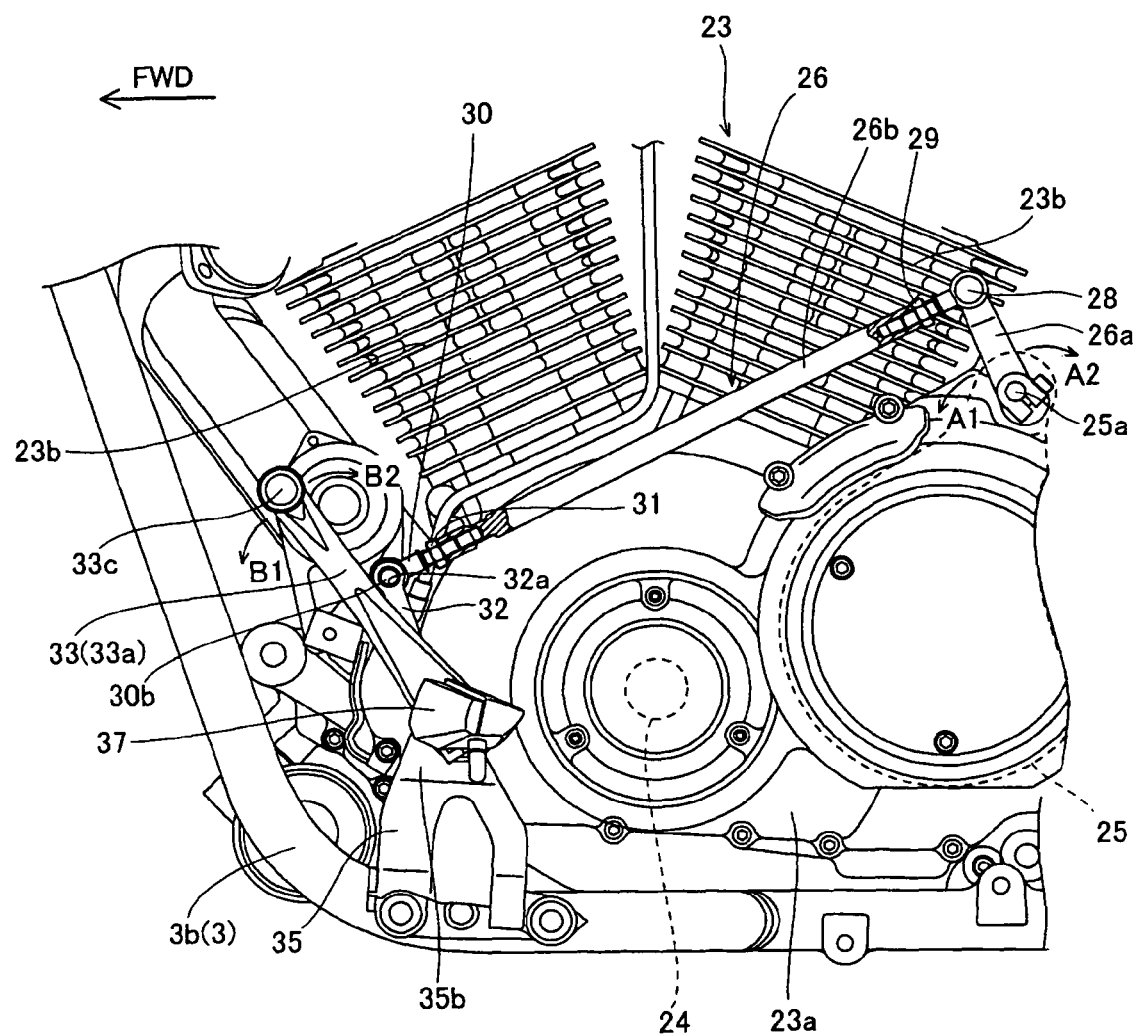
FIG. 3 is a side view showing a crankcase part of an engine of the motorcycle shown in FIG. 1.

In an exemplary aspect of the invention, a link member 26 may be connected to the deceleration mechanism 25. The link member 26 is disposed more outward in the vehicle width direction, and in particular the direction of the arrow X2 shown in FIG. 2, than the crankcase part 23a and is disposed above the crankshaft 24. As shown in FIG. 3, the link member 26 includes a lever part 26a for rotating a shaft member 25a in direction A1 and direction A2. The shaft member 25a is inserted into the crankcase part 23a. The link member 26 further includes a link rod 26b. Rod 26b has a rear end, disposed in the rearward direction, and rotatably connected to an upper end of the lever part 26a. Rod 26b also has a front end, disposed in the forward direction, and rotatably connected to an upper end of an arm member 32.

Figure 4:
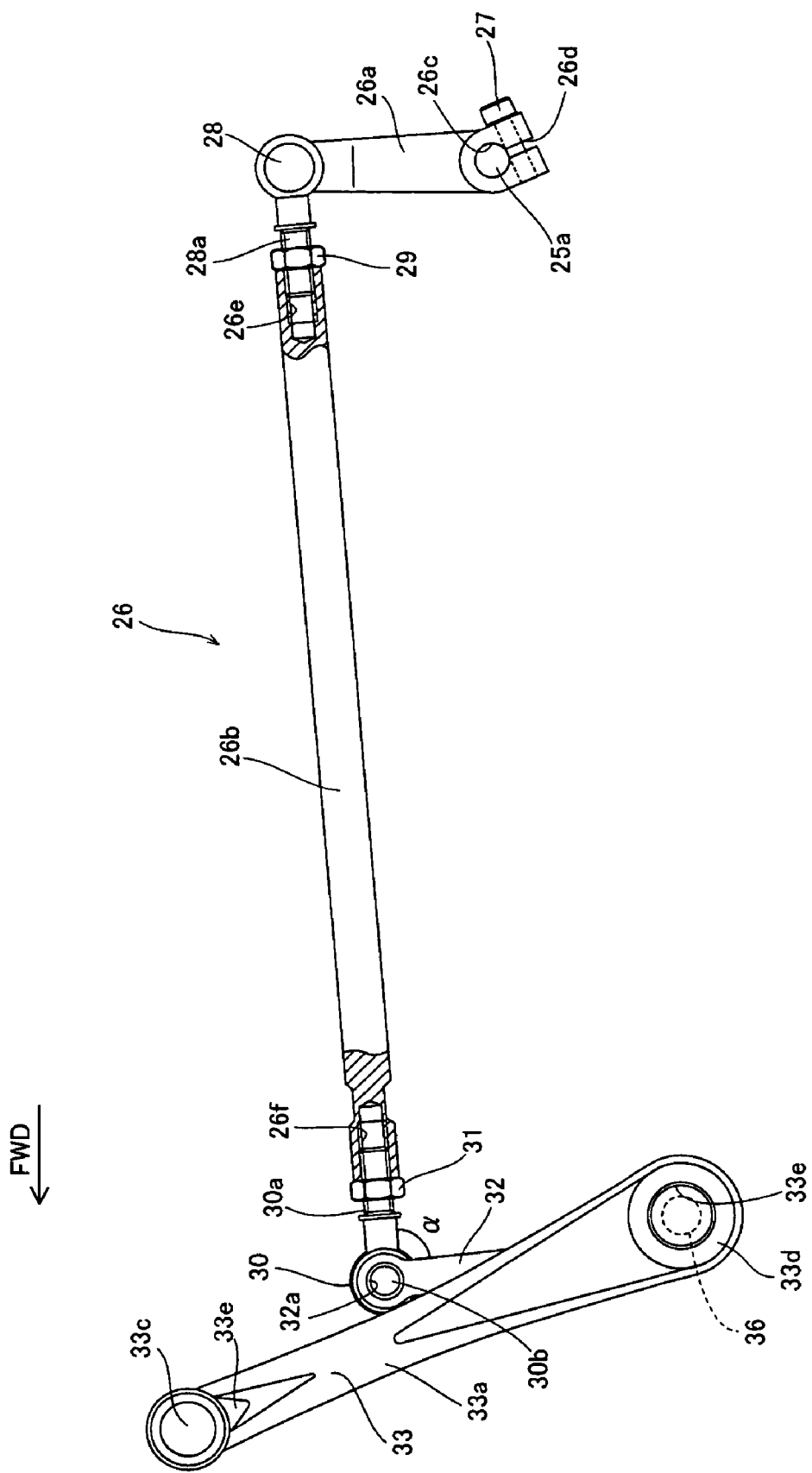
FIG. 4 is a side view showing a shift pedal member and a link member of the motorcycle shown in FIG. 1.

As shown in FIG. 4, the lever part 26a has an insertion hole 26c in a region of a lower end thereof. The shaft member 25a is inserted in the insertion hole 26c. A slit 26d is formed between the insertion hole 26c and the lower end of the lever part 26a. A gap formed by the slit 26d is adjustable using a bolt member 27. That is, a diameter of the insertion hole 26c can be made larger or smaller by the use of the bolt member 27. Therefore, a mount angle of the lever part 26a to the shaft member 25a is adjustable.

Figure 5:
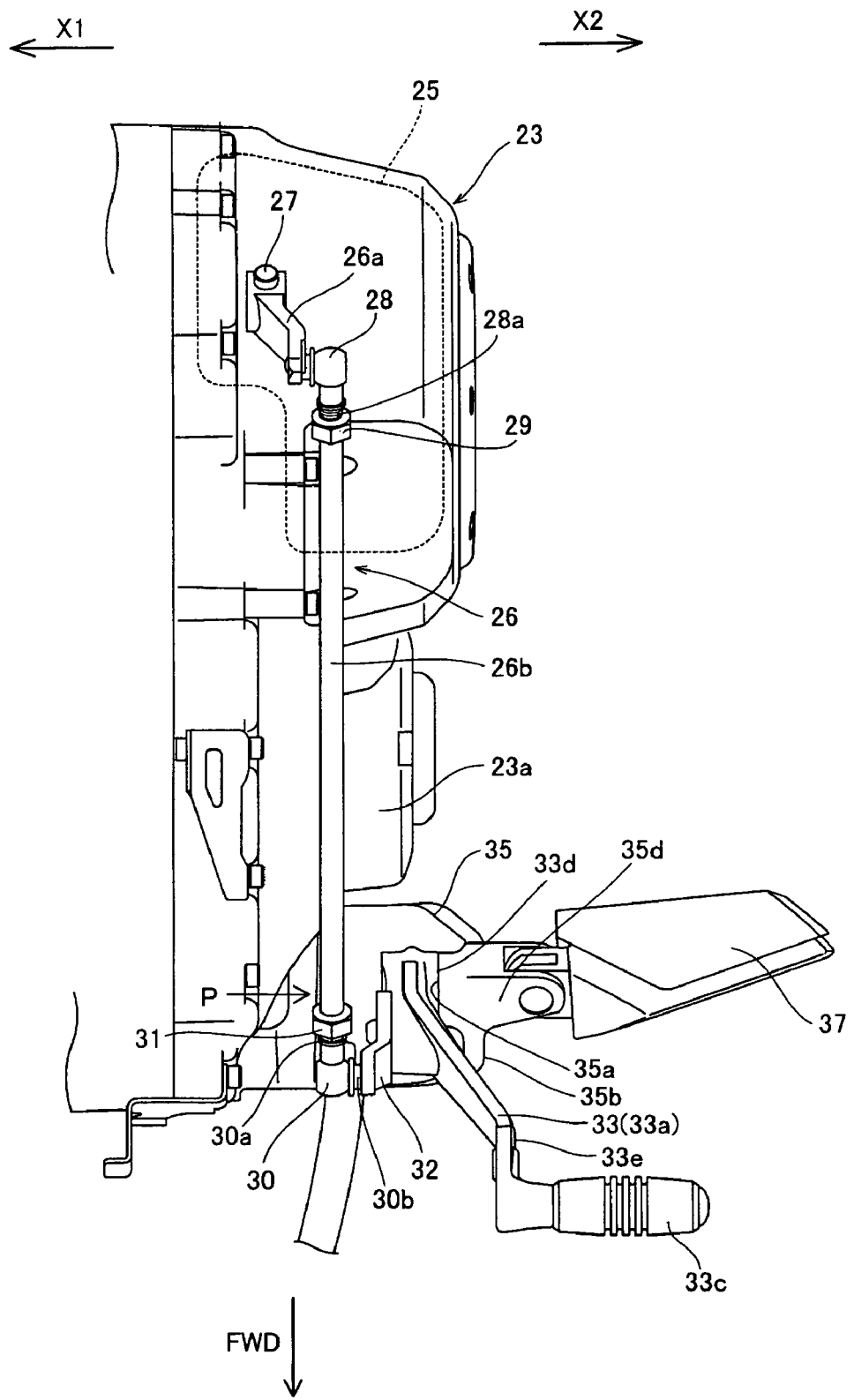
FIG. 5 is a plan view showing the crankcase part of the engine of the motorcycle shown in FIG. 1.

As shown in FIGS. 4 and 5, one end of a pillow ball 28 is mounted in a vicinity of the upper end of the lever part 26a. As shown in FIG. 4, a bolt part 28a is provided at the other end of the pillow ball 28. The bolt part 28a is threadably inserted in a threaded hole 26e formed in the rear end of the rod 26b. The lever part 26a and the rod 26b are connected together via the pillow ball 28 as described above. Thus, the rod 26b is rotatably connected to the lever part 26a.

A nut 29 may be disposed on the bolt part 28a of the pillow ball 28. The nut 29 abuts against the rear end of the rod 26b after the bolt part 28a of the pillow ball 28 is threaded in the threaded hole 26e of the rod 26b to a prescribed inserting depth. Thus, the nut 29 locks the bolt part 28a in the threaded hole 26e at the prescribed inserting depth.

A threaded hole 26f is formed in a front end of the rod 26b. A bolt part 30a is formed at one end of a pillow ball 30. Bolt part 30a is threadably inserted in the threaded hole 26f. A nut 31 is disposed on the bolt part 30a. The nut 31 abuts against the front end of the rod 26b after the bolt part 30a of the pillow ball 30 is inserted in the threaded hole 26f of the rod 26b to a prescribed inserting depth. Thus, the nut 31 locks the bolt part 30a in the threaded hole 26f at the prescribed inserting depth.

In an exemplary aspect of the invention, as shown in FIGS. 4 and 5, the arm member 32 extends essentially in a vertical direction. By using the term "essentially", it is understood that the arm member may be positioned to extend in a direction that departs slightly from a true vertical position, but that it is positioned to be closer to a vertical position than to a horizontal position. Further, the arm member 32 comprises a plate member having a thickness in the vehicle width direction that is smaller than its width in the fore-and-aft direction.

As shown in FIG. 4, the upper end of the arm member 32 is mounted on the other end of the pillow ball 30. In particular, the upper end of the arm member 32 includes an insertion hole 32a. An insertion shaft 30b is formed at the other end of the pillow ball 30. The insertion shaft 30b of the pillow ball 30 is press-fitted into the insertion hole 32a of the arm member 32. The rod 26b and the arm member 32 are thus connected together via the pillow ball 30. Consequently, the rod 26b is rotatably connected to the arm member 32.

In this exemplary aspect of the invention, as shown in FIG. 4, the arm member 32 and the link member 26 extend substantially perpendicularly to each other, with an intersecting angle a of about 90°, as seen from the left side of the vehicle 1 (see FIG. 1), and in a state that a shift pedal member 33 is not rotated. Specifically, to achieve this arrangement, the bolt part 28a of the pillow ball 28 is inserted in the threaded hole 26e of the rod 26b to the prescribed inserting depth, and the bolt part 30a of the pillow ball 30 is inserted in the threaded hole 26f of the rod 26b to the prescribed inserting depth. Further, a mount angle of the lever part 26a to the shaft member 25a is adjusted using the bolt member 27. These features allow the arm member 32 and the link member 26 to be adjusted to extend substantially perpendicularly to each other, when the shift pedal 33 is in a non-rotated state.

Figure 6:
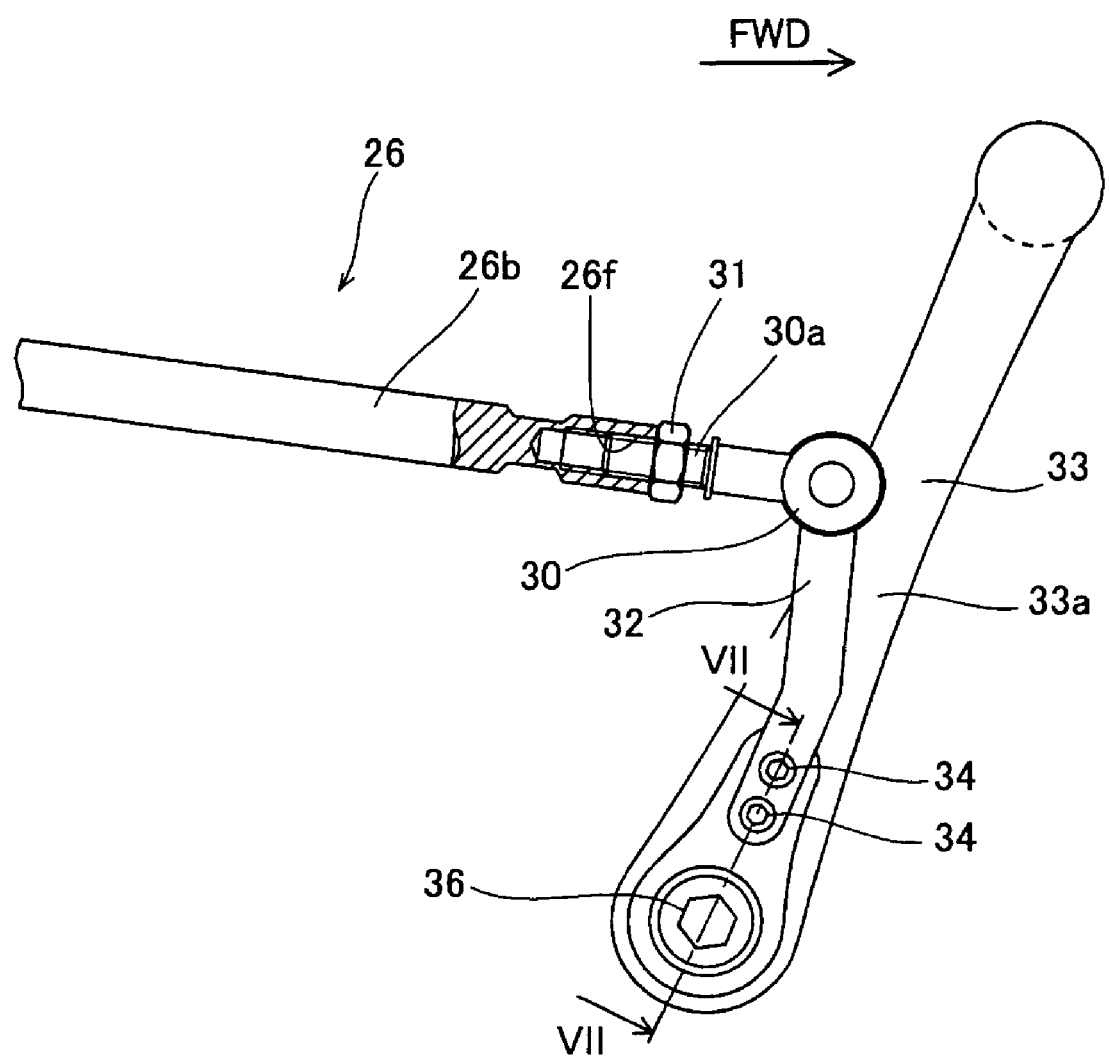
FIG. 6 is a view as seen from the direction of the arrow P in FIG. 5.
Figure 7:
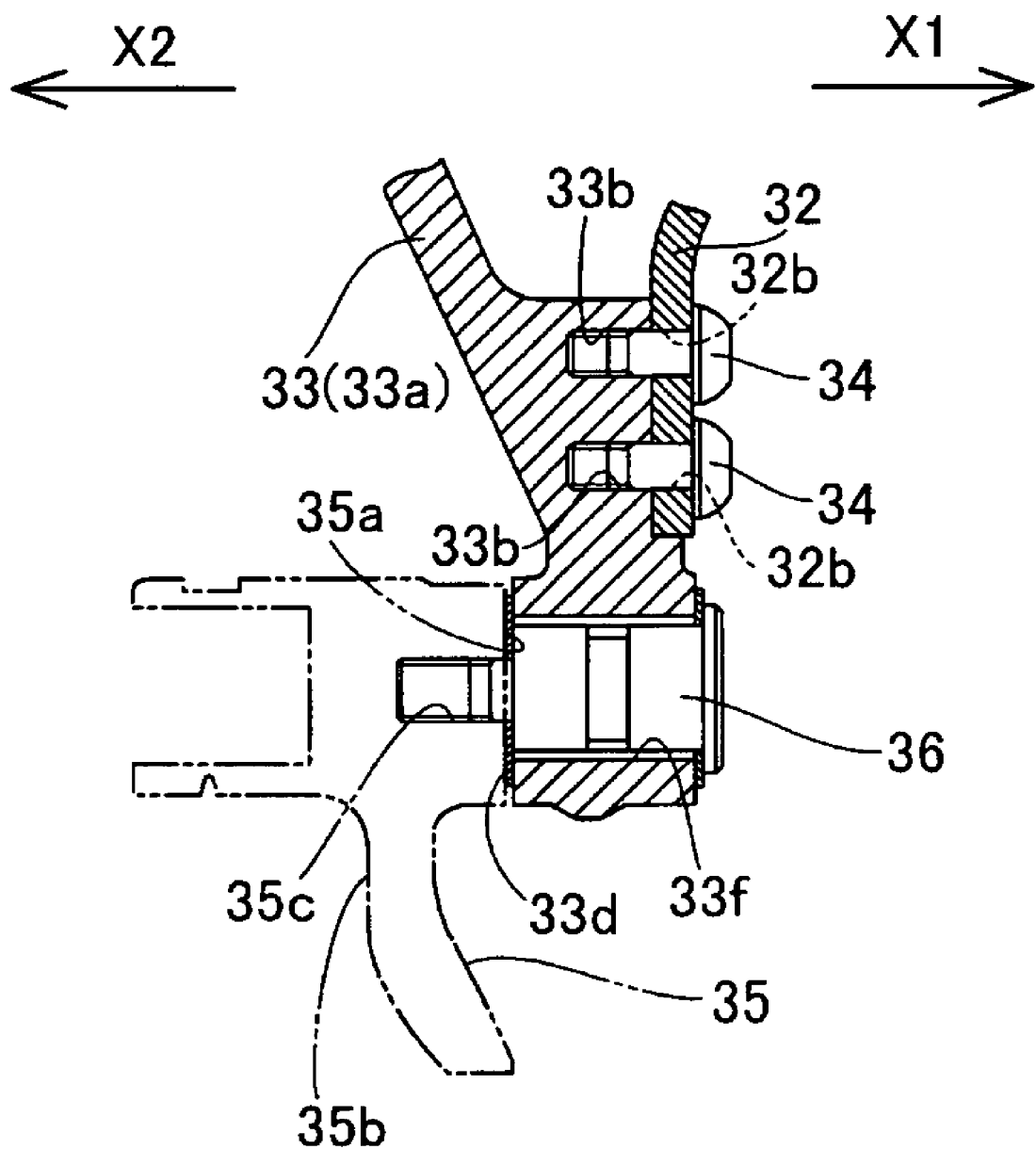
FIG. 7 is a cross-sectional view taken along line VII-VII in FIG. 6.

Referring also to FIGS. 6 and 7, a lower end of the arm member 32, in a vicinity of a pedal rotating shaft member 36, is directly mounted on a main body 33a of the shift pedal member 33. Specifically, as shown in FIG. 7, two bolt insertion holes 32b are formed in the lower part of the arm member 32. Two threaded holes 33b corresponding to the respective bolt insertion holes 32b are formed in a lower part of the shift pedal member 33. Two bolt members 34 are screwed into the respective threaded holes 33b via the respective bolt insertion holes 32b, to thereby fix the arm member 32 and the shift pedal member 33 together.

In this exemplary aspect of the invention, as shown in FIGS. 2 and 5, the main body 33a of the shift pedal member 33 extend essentially in a vertical direction. By using the term "essentially", it is understood that the main body may be positioned to extend in a direction that departs from a true vertical position, but that it is positioned to be closer to a vertical position than to a horizontal position. Further, a pedal part 33c, which protrudes in the direction of the arrow X2, is mounted on an upper part of the main body 33a. The main body 33a is shaped so that the upper part thereof inclines in the direction of the arrow X2 relative to a lower part of the main body 33a, so that the upper part of the main body is disposed more outward than the lower part. Specifically, as shown in FIGS. 2 and 7, the lower end of the main body 33a has an outside surface 33d disposed to face an inside surface 35a of a bracket 35, and the upper end of the main body has an outside surface 33e that is disposed more outward (in the direction of the arrow X2) than an outside surface 35b of the bracket 35.

As shown in FIGS. 4 and 7, a shaft insertion hole 33f may be formed in the lower part of the main body 33a. The pedal rotating shaft, such as the pedal rotating shaft member 36, is inserted in the shaft insertion hole 33f. The pedal rotating shaft member 36 inserted in the shaft insertion hole 33f is then screwed into a threaded hole 35c of the bracket 35. Thus, the shift pedal member 33 can be rotated around the pedal rotating shaft member 36 in directions B1 and B2 (see FIG. 3). The bracket 35 has a first portion fixed to the down tube 3b which extends in the direction of the arrow X2 for a prescribed length, and a second portion that curves and extends upward from the first portion for a prescribed length. The threaded hole 35c is formed in the inside surface 35a of the second portion.

Referring to FIG. 5, the pedal part 33c is provided to allow a rider of the vehicle 1 to operate the shift pedal member 33. In this exemplary aspect of the invention, the shift pedal member 33 has only one pedal, e.g., the pedal part 33c, to be operated by the rider. In other words, the deceleration mechanism 25 of the engine 23 may be actuated using only one pedal, that is, the pedal part 33c.

A footrest mounting part 35d may be formed on the outside surface 35b of the bracket 35. A footrest 37, for the placement of the foot of the rider, may be mounted on the footrest mounting part 35d.

Figure 8:
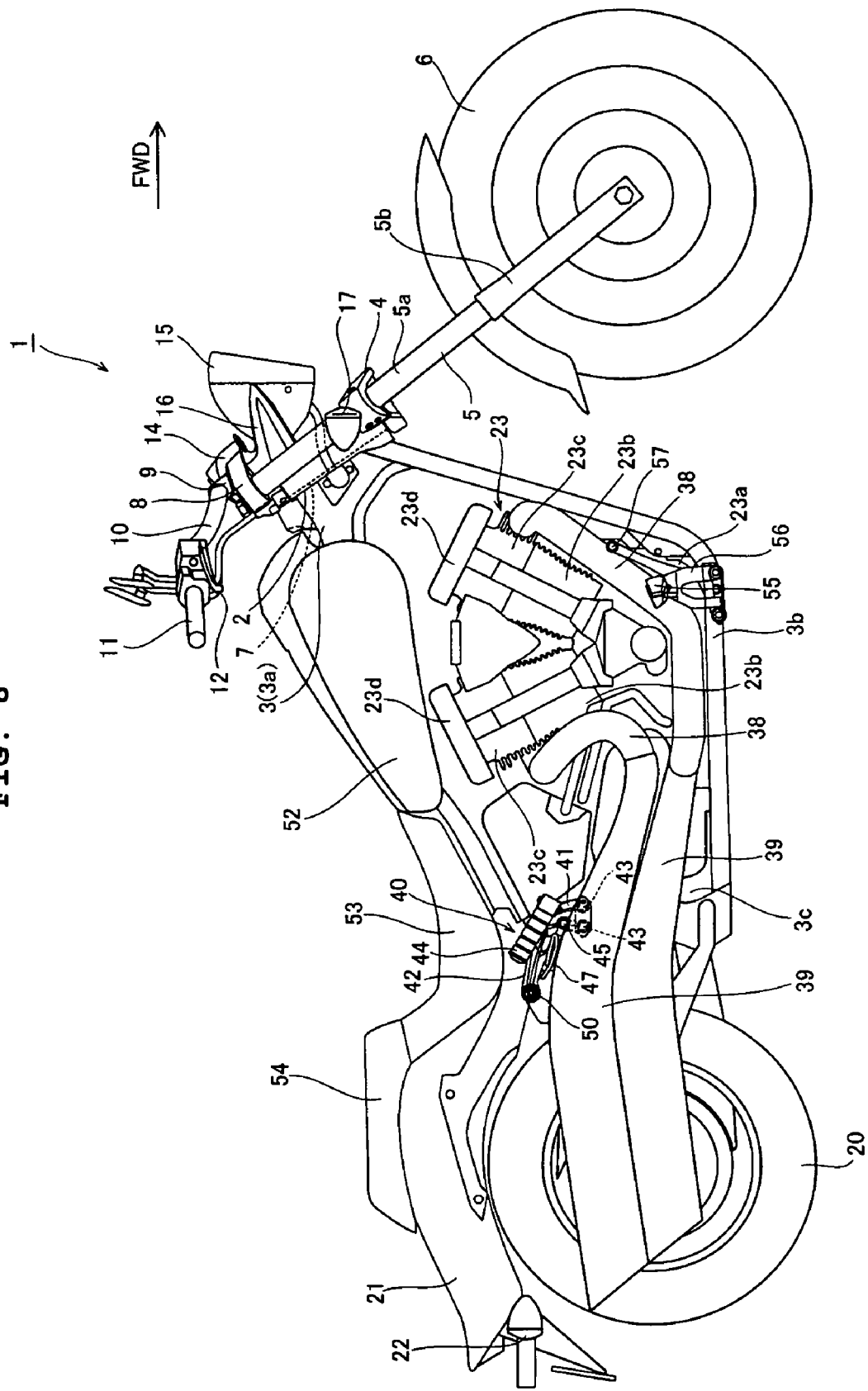
FIG. 8 is a right side view of the motorcycle shown in FIG. 1.
Figure 9:
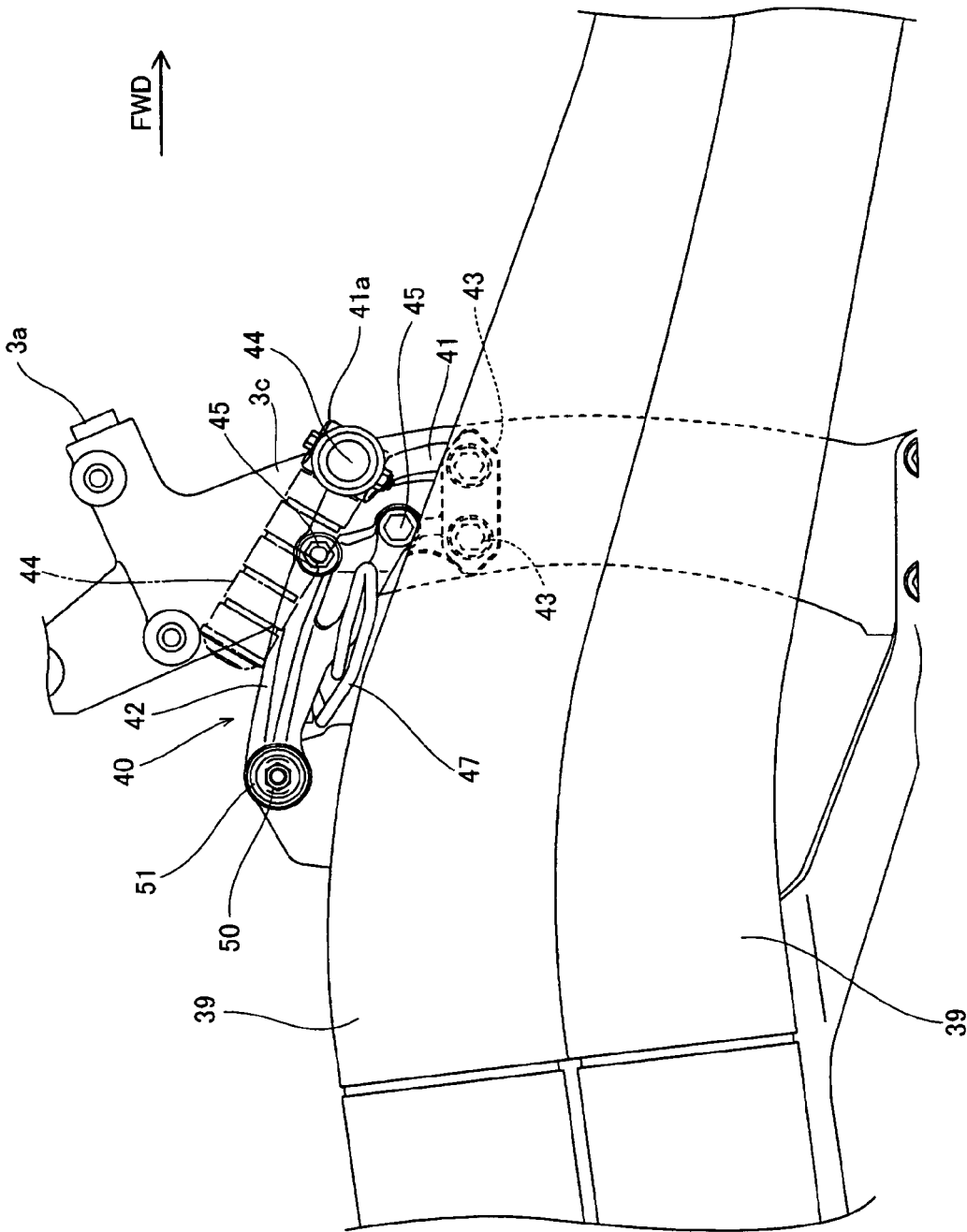
FIG. 9 is a side view showing a bracket unit of the motorcycle shown in FIG. 1.
Figure 10:
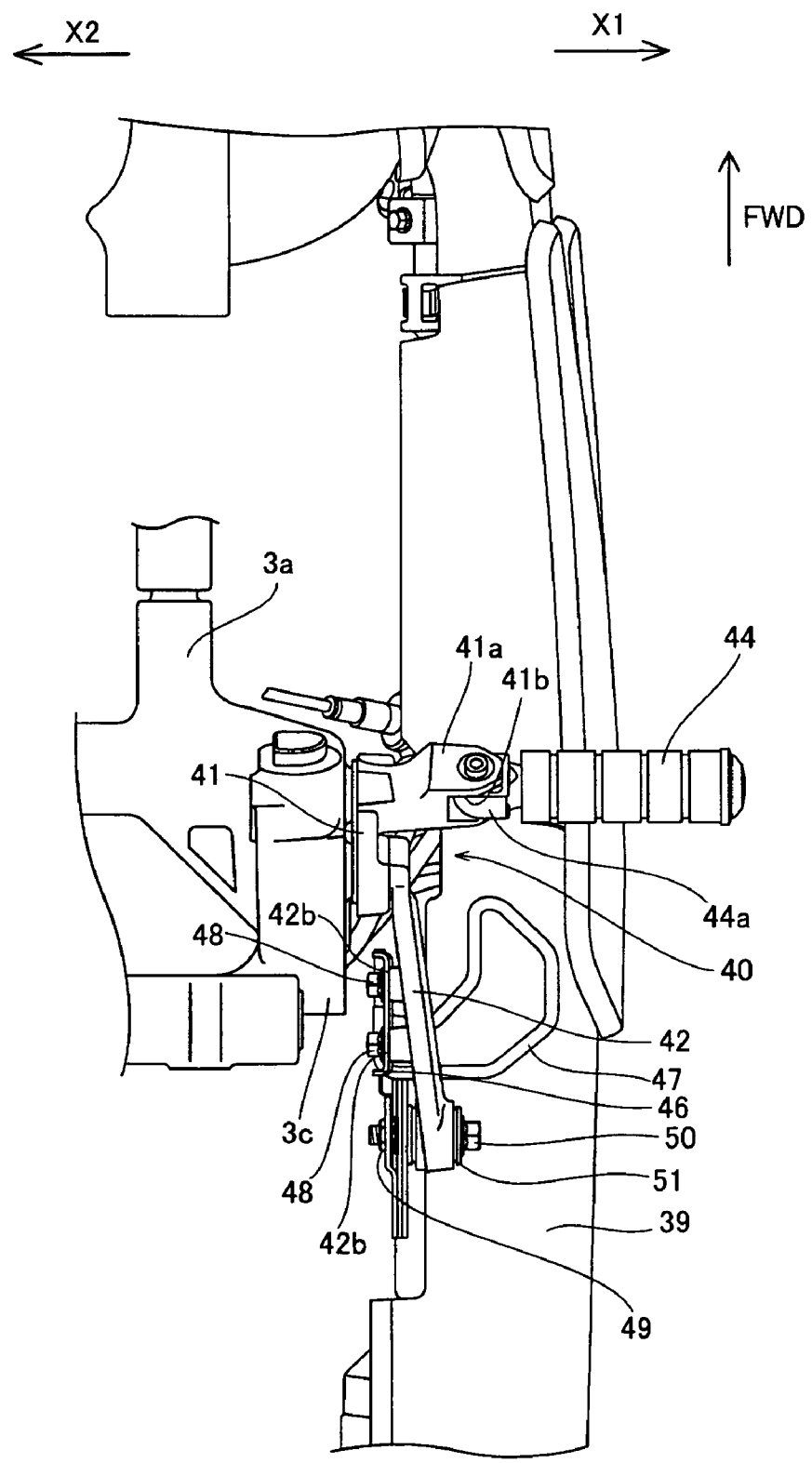
FIG. 10 is a plan view showing the bracket unit of the motorcycle shown in FIG. 1.

As shown in FIG. 8, an exhaust pipe 38 may be connected to the cylinder head 23c of the engine 23. A rearwardly extending muffler 39 may be connected to the exhaust pipe 38. As shown in FIGS. 8 and 9, the muffler 39 is retained by a bracket unit 40 mounted on the rear frame 3c of the mainframe 3. As shown in FIGS. 9 and 10, the bracket unit 40 includes a tandem footrest bracket 41 mounted on the rear frame 3c, and a muffler retaining bracket 42 mounted on the tandem footrest bracket 41.

Figure 11:
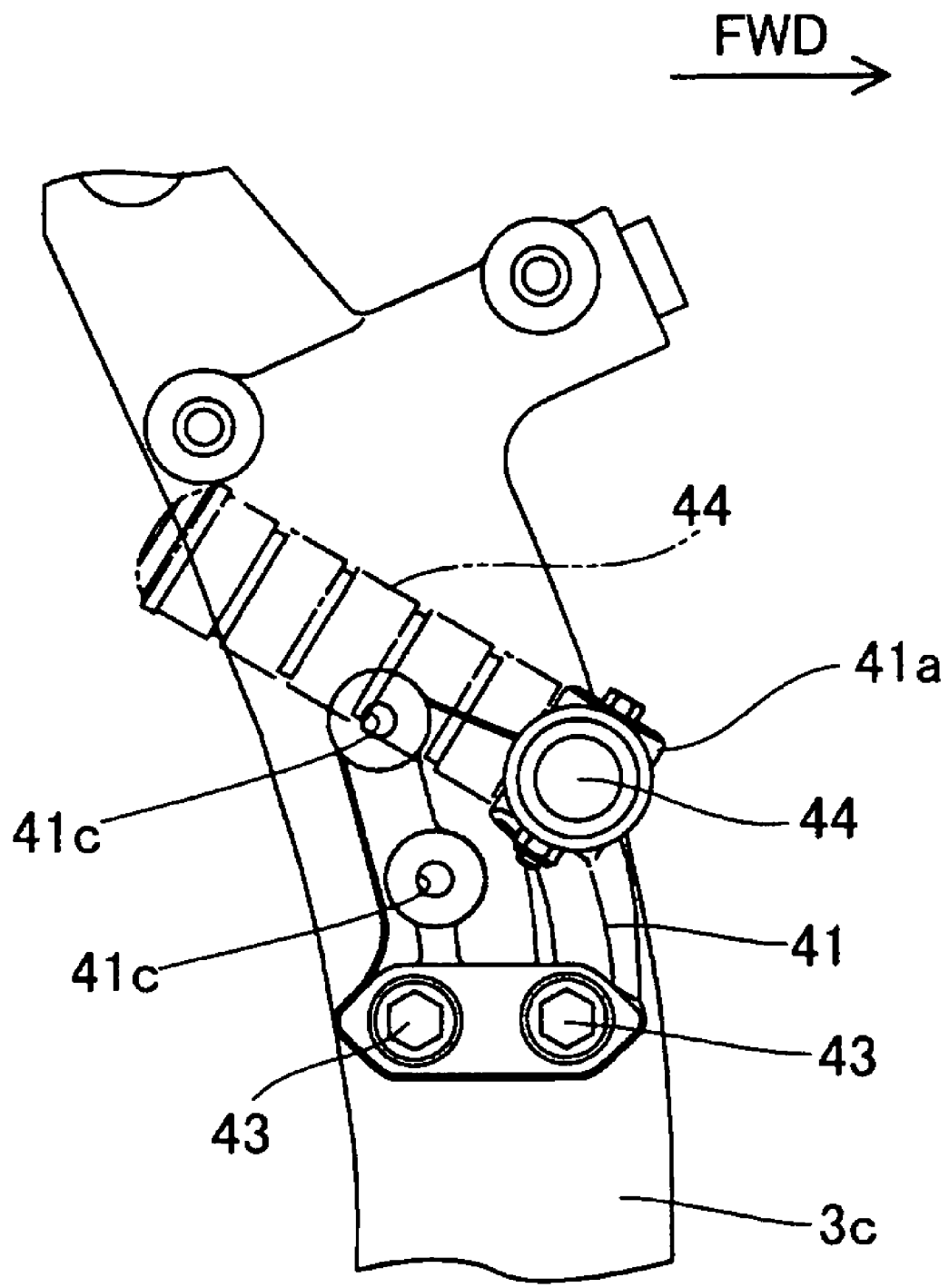
FIG. 11 is a side view showing a tandem footrest bracket of the motorcycle shown in FIG. 1.
Figure 12:
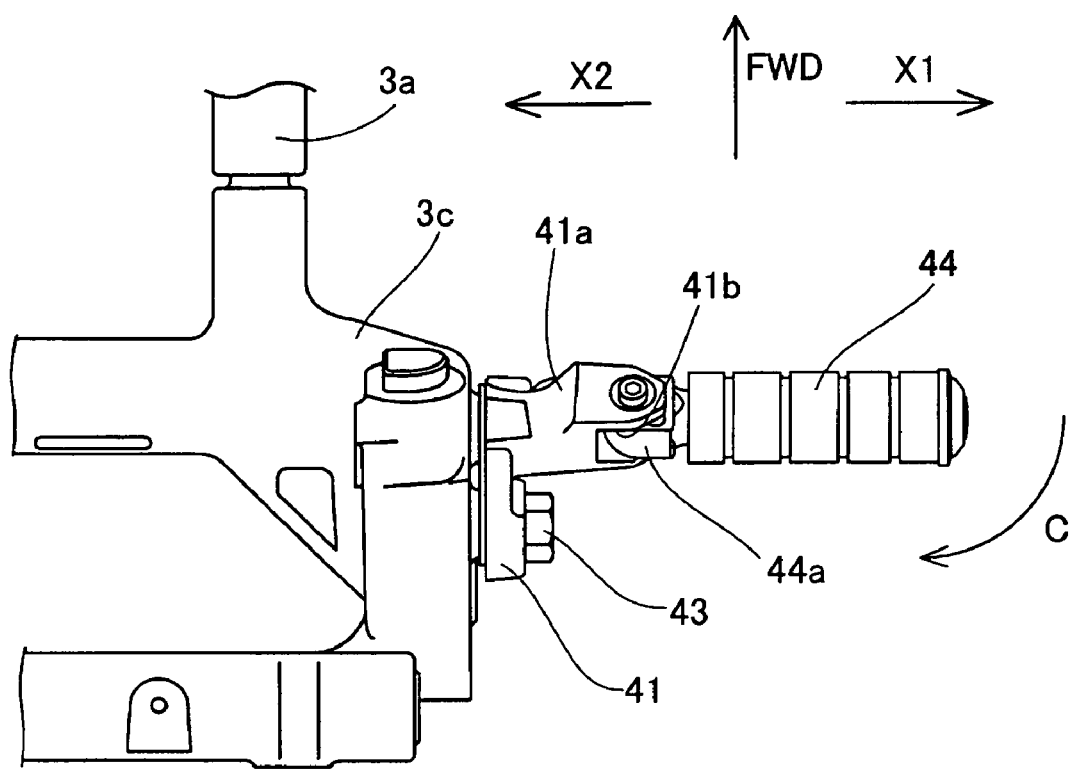
FIG. 12 is a plan view showing the tandem footrest bracket of the motorcycle shown in FIG. 1.
Figure 13:
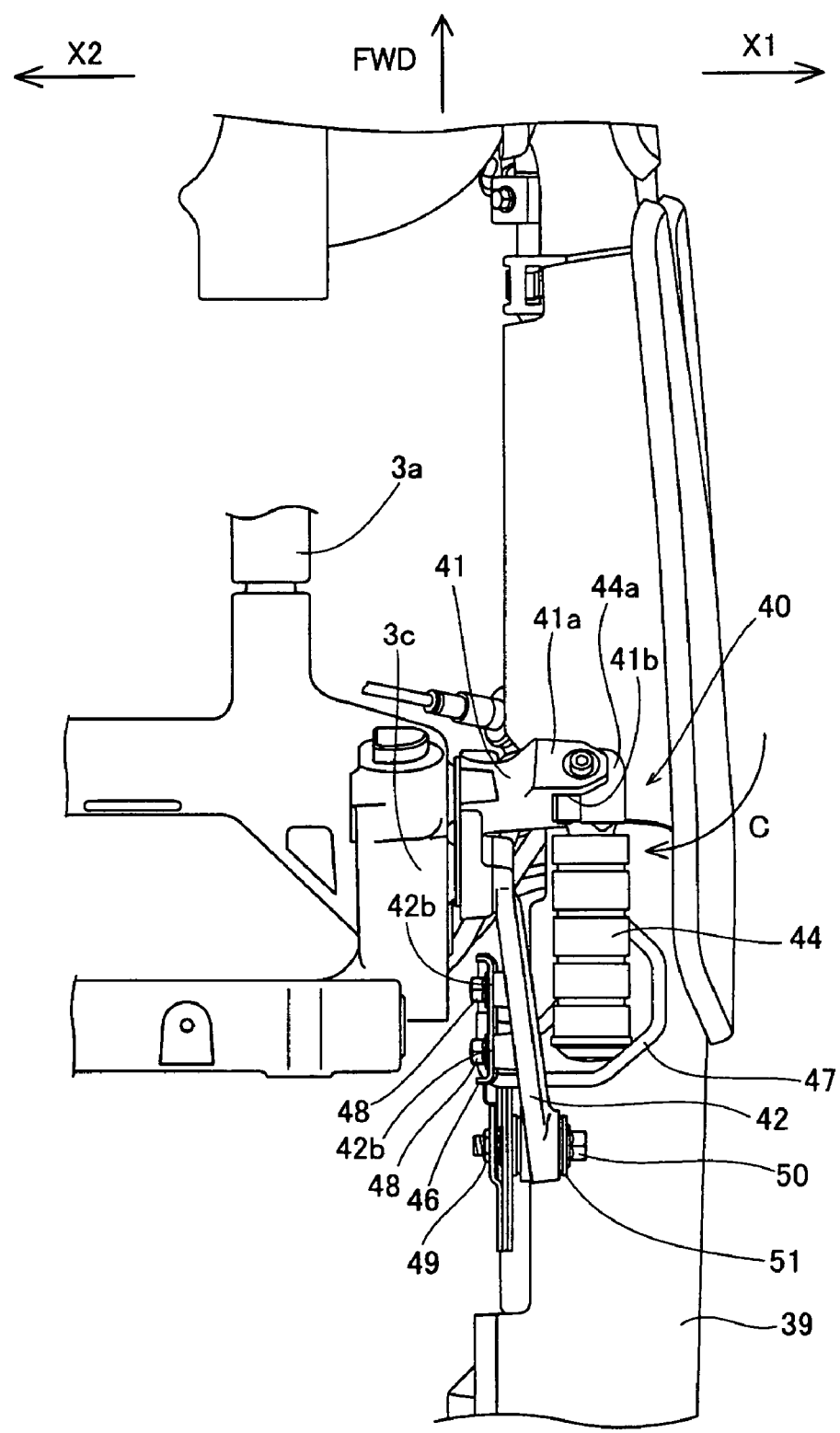
FIG. 13 is a plan view showing the bracket unit of the motorcycle shown in FIG. 1, but with the tandem footrest folded.

As shown in FIGS. 11 and 12, a lower part of the tandem footrest bracket 41 is fixed to the rear frame 3c with two bolt members 43, to mount the tandem footrest bracket 41 on the mainframe 3. As shown in FIG. 11, the tandem footrest bracket 41 extends upward. A tandem footrest mounting part 41a is formed at an upper part of the tandem footrest bracket 41 in the forward direction. As shown in FIG. 12, the tandem footrest mounting part 41a has a U-shaped yoke. A mounting part 44a for a tandem footrest 44 is disposed in a gap 41b of the yoke. The tandem footrest 44, once it is mounted on the tandem footrest bracket 41, is rotatable in direction C. That is, as shown in FIG. 13, the tandem footrest 44 is foldable in direction C. The tandem footrest 44 is provided for a passenger seated on a rear seat 54 to place his or her foot.

Figure 14:
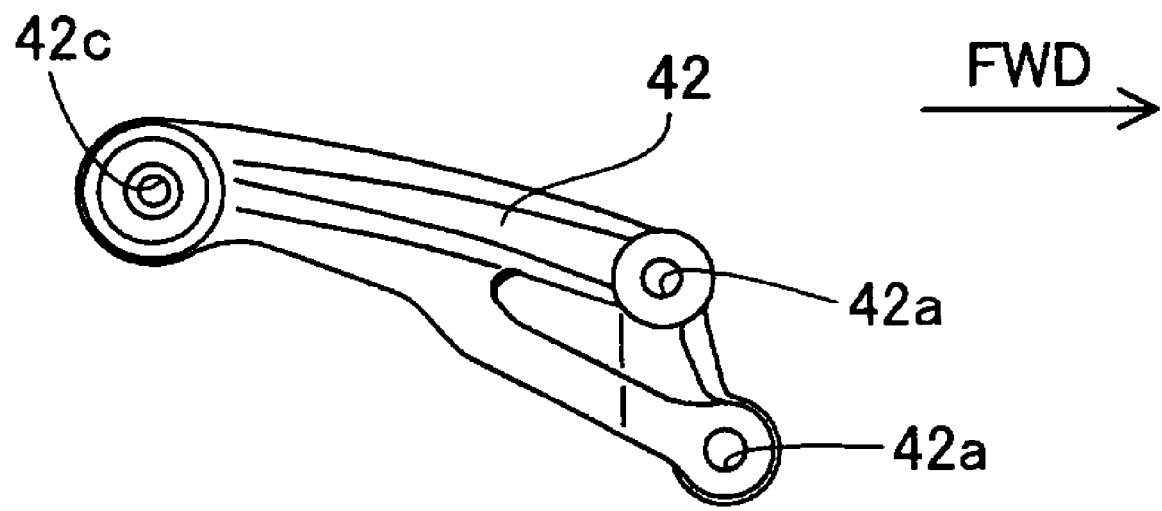
FIG. 14 is a side view showing a muffler retaining bracket of the motorcycle shown in FIG. 1.

As shown in FIG. 11, two threaded holes 41c for mounting the muffler retaining bracket 42 are formed in a rear portion of the tandem footrest bracket 41. As shown in FIG. 14, two bolt insertion holes 42a are formed in the muffler retaining bracket 42 corresponding to the two threaded holes 41c of the tandem footrest bracket 41. Further, as shown in FIG. 9, two bolt members 45 are screwed into the respective threaded holes 41c via the respective bolt insertion holes 42a to thereby fix the muffler retaining bracket 42 and the tandem footrest bracket 41 together.

As shown in FIGS. 9 and 10, the muffler retaining bracket 42 extends in the rearward direction. As shown in FIG. 10, a center, in the fore-and-aft direction, of the muffler retaining bracket 42 includes a retaining wire mounting surface 42b, which protrudes in the direction of the arrow X2. A foot placing wire 47 is mounted on the retaining wire mounting surface 42b using two bolt members 48 and a plate member 46. The foot placing wire 47 is formed so that when the foot of a passenger seated on the rear seat is placed on the tandem footrest 44, the heel of the foot can be placed on the foot placing wire. The foot placing wire 47 is disposed behind the tandem footrest 44.

As shown in FIG. 14, a bolt insertion hole 42c is formed in a rear end of the muffler retaining bracket 42. As shown in FIG. 10, a nut 49 corresponding to the bolt insertion hole 42c is mounted on the muffler 39. A bolt member 50, which is inserted through a washer 51 and the bolt insertion hole 42c, is screwed into the nut 49. This configuration fixes and retains the muffler 39 on the muffler retaining bracket 42.

As shown in FIG. 8, a fuel tank 52 is disposed above the engine 23. A speedometer (not shown) may be disposed above the fuel tank 52. A front seat 53 for the rider is provided at a rear of the fuel tank 52. A rear seat 54 for the passenger may be provided behind the front seat 53.

A footrest 55 may be mounted on the down tube 3b in the direction of the arrow X1 using a bracket 56. As shown in FIG. 2, the bracket 56 includes a first portion that is fixed to the down tube 3b and that extends in the direction of the arrow X1 for a prescribed length, and a second portion that curves upward from the first part for a prescribed length. As shown in FIGS. 2 and 8, the footrest 55 is mounted on an upper end of the bracket 56, and provided below a footbrake 57 used for braking the rear wheel 20.

In the exemplary described embodiment, the vehicle includes the shift pedal member 33 for actuating the deceleration mechanism 25 of the engine 23, and the arm member 32 which has its lower end directly mounted on the shift pedal member 33. Thus, a distance between the outside surface 33d of the shift pedal member 33 and the outside surface of the arm member 32 in the direction of the arrow X1 can be made shorter than the prior art configurations, due to the direct mounting of the arm member 32 on the shift pedal member 33. This prevents the shift pedal member 33 from overhanging outward too far in the vehicle width direction. As a result, the vehicle 1 can be tilted more closely to the ground when turning the vehicle. Accordingly, the steering characteristics in a turn are improved.

In the exemplary embodiments, the main body 33a of the shift pedal member 33 is constructed so that its upper part, on which the pedal part 33c is mounted, inclines in the direction of the arrow X2 relative to its lower part, on which the pedal rotating shaft member 36 is mounted. This prevents the lower part of the shift pedal member 33 from overhanging outward too far in the vehicle width direction, so that the lower part and the upper part of the shift pedal member 33 is prevented from contacting the ground when the vehicle 1 is tilted.

In the exemplary embodiments, the pedal rotating shaft member 36 is directly mounted on the bracket 35. This configuration causes the pedal rotating shaft member 36 to be stably mounted on the bracket 35, which is in turn mounted on the down tube 3b of the mainframe 3. Therefore, the shift pedal member 33 can be stably rotated.

In the exemplary embodiment, the lower end of the arm member 32 is bolted to the main body 33a of the shift pedal member 33. This configuration allows the arm member 32 and the shift pedal member 33, which overlap as seen from the side, to be detachable by means of the bolt member 34. Thus, the arm member 32 and the link member 26 can be connected together while the arm member 32 and the shift pedal member 33 are separated from each other. As a result, a process for combining the arm member 32 with the link member 26 is simplified. Further, since the arm member 32 is bolted to the main body 33a of the shift pedal member 33 after combining the arm member 32 with the link member 26, a process for combining the arm member 32 with the main body 33a of the shift pedal member 33 is simplified.

In the exemplary described embodiments, the arm member 32 and the link member 26 are adjustable to extend substantially perpendicular to each other when the shift pedal member 33 is not rotated. Thus, when the arm member 32 is rotated, generated force components transmitted from the arm member 32 to the link member 26 via the pillow ball 30 are prevented from dispersing in directions except for the axial direction of the link member 26. Therefore, a rotational force of the arm member 32 is effectively transmitted to the link member 26.

It should be noted that the embodiments disclosed herein are illustrative in all points, and the present invention is not limited thereto. The scope of the present invention is not specified by the descriptions about the foregoing embodiment, but by the claims. Further, the scope of the present invention includes all equivalents and modifications that fall within the spirit and the scope of the claims.

In the above exemplary embodiments, the pedal rotating shaft member is described as being provided on the bracket fixed to the down tube. However, the present invention is not limited to this arrangement. Instead, for example, the pedal rotating shaft member may be provided on the engine.

In the above described exemplary embodiments, the lower end of the arm member is described as being bolted to the main body of the shift pedal member to thereby directly fix the arm member and the shift pedal member together. However, the present invention is not limited to this arrangement. For example, the arm member and the shift pedal member may be directly fixed together using other connection methods such as welding.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes and adaptations, and the same are intended to be comprehended within the meaning and range of equivalents of the appended claims.

What is claimed is:

1. A vehicle, comprising:
an engine including a crankcase, and a deceleration mechanism inside the crankcase;
a shift pedal member for actuating the deceleration mechanism, the shift pedal member including a main body and a pedal rotating shaft mounted on the main body;
an arm member having a first end directly mounted on the main body; and
a link member rotatably connected to a second end of the arm member and being connected to the deceleration mechanism;
wherein the arm member is mounted on the shift pedal member in a region of the pedal rotating shaft; and
wherein the main body includes an upper end and a lower end, the pedal rotating shaft being mounted in a region of the lower end, the shift pedal member further includes at least one pedal part, mounted on the upper end of the main body, the pedal part protruding outward in a vehicle width direction, and wherein the main body of the shift pedal member includes an upper part, which includes the upper end, that inclines outward in the vehicle width direction relative to the lower end of the main body.

2. A vehicle, comprising:
an engine including a crankcase, and a deceleration mechanism inside the crankcase;
a shift pedal member for actuating the deceleration mechanism;
an arm member having a first end directly mounted on the shift pedal member; and
a link member rotatably connected to a second end of the arm member and being connected to the deceleration mechanism;
wherein the shift pedal member includes a main body, and a pedal rotating shaft mounted on the main body and about which the main body rotates, and the arm member is mounted on the shift pedal member in a region of the pedal rotating shaft;
wherein the main body includes an upper end and a lower end, the pedal rotating shaft being mounted in a region of the lower end, the shift pedal member further includes at least one pedal part, mounted on the upper end of the main body, the pedal part protruding outward in a vehicle width direction, and wherein the main body of the shift pedal member includes an upper part, which includes the upper end, that inclines outward in the vehicle width direction relative to the lower end of the main body;
the vehicle further comprising a mainframe on which the engine is mounted; and
a bracket mounted on the mainframe, wherein an outside surface of the lower end of the main body, in the vehicle width direction, and vicinal to where the pedal rotating shaft is mounted, is disposed to face an inside surface of the bracket, in the vehicle width direction, and
wherein an outside surface of the upper end of the main body, in the vehicle width direction, and vicinal to where the pedal part is mounted, is disposed more outward than an outside surface of the bracket, in the vehicle width direction.

3. The vehicle according to claim 1, wherein said at least one pedal part comprises only one pedal part provided on the shift pedal member, and the deceleration mechanism is actuated by said only one pedal part.

4. A vehicle, comprising:
an engine including a crankcase, and a deceleration mechanism inside the crankcase;
a shift pedal member for actuating the deceleration mechanism;
an arm member having a first end directly mounted on the shift pedal member; and
a link member rotatably connected to a second end of the arm member and being connected to the deceleration mechanism;
wherein the shift pedal member includes a main body, and a pedal rotating shaft mounted on the main body and about which the main body rotates, and the arm member is mounted on the shift pedal member in a region of the pedal rotating shaft;
the vehicle further comprising a mainframe on which the engine is mounted; and
a bracket mounted on the mainframe, wherein the pedal rotating shaft is directly mounted on the bracket, and is positioned below where the arm member is mounted on the shift pedal member.

5. The vehicle according to claim 1, wherein the arm member and the shift pedal member overlap each other, and are connected together at a location where they overlap, and wherein the first end of the arm member is a lower end of the arm member, and is bolted to a main body of the shift pedal member.

6. The vehicle according to claim 1, wherein the arm member and the link member are adjustable relative to each other so that the link member and the arm are essentially perpendicular to each other when the shift pedal member is not rotated.

7. The vehicle according to claim 1, further comprising:
a crankshaft disposed inside the crankcase, wherein the link member is disposed more outward in a vehicle width direction than the crankcase, and is disposed above the crankshaft.

8. A shift assembly for a vehicle, comprising:
a shift pedal member having a main body that is rotatably attachable to the vehicle, the main body having a bend therein, so that a lower end thereof that is attachable to the vehicle is disposed closer to the vehicle than an upper end thereof;
a shift pedal attached to the upper end of the main body; and
an arm member having a lower end mounted on, so as to be directly touching, the lower end of the main body of the shift pedal member.

9. The shift assembly recited in claim 8, further comprising a link member rotatably connected to an upper end of the arm member.

10. The shift assembly recited in claim 8, wherein the arm member and the link member are adjustable relative to each other so that the link member and the arm member are essentially perpendicular to each other when the shift pedal member is not rotated.

11. The shift assembly recited in claim 8, wherein the lower end of the arm member is bolted to the main body of the shift pedal member, so that the arm member and the shift pedal member overlap each other.

12. A shift assembly for a vehicle, comprising:
a shift pedal member having a main body that is rotatably attachable to the vehicle, the main body having a bend therein, so that a lower end thereof that is attachable to the vehicle is disposed closer to the vehicle than an upper end thereof;
a shift pedal attached to the upper end of the main body;
an arm member having a lower end mounted on, so as to be directly touching, the lower end of the main body of the shift pedal member; and
a link member having a lever rotatably connectable to an engine of the vehicle, a plurality of pillow balls, and a link rod having opposing ends, each end having an axially-disposed threaded hole that is threadably engaged with a respective pillow ball, with one of the pillow balls being rotatably connected to an upper end of the arm member, and another one of the pillow balls being rotatably connected with an upper end of the lever.

13. The shift assembly recited in claim 12, wherein the arm member and the link member are adjustable relative to each other by threading the respective pillow balls in their respective threaded holes, so that the link rod and the arm member are essentially perpendicular to each other when the shift pedal member is not rotated.

14. The shift assembly recited in claim 8, wherein the shift pedal member and the arm member each extend upward in essentially a same direction, and wherein said shift pedal member angles outward and away from said arm member, so that the upper end of the main body of the shift pedal member is disposed spaced away from an upper end of said arm member.

15. The shift assembly recited in claim 14, wherein the pedal is pressable by a foot of a rider of the vehicle, to cause said shift pedal member and said arm member to rotate about the lower end of the main body of the shift pedal member.

16. A shift assembly for a vehicle, comprising:
a shift pedal member having a main body that is rotatably attachable to the vehicle, the main body having a bend therein, so that a lower end thereof that is attachable to the vehicle is disposed closer to the vehicle than an upper end thereof;
a shift pedal attached to the upper end of the main body; and
an arm member having a lower end mounted on, so as to be directly touching, the lower end of the main body of the shift pedal member;
wherein the shift pedal member and the arm member each extend upward in essentially a same direction, and wherein said shift pedal member angles outward and away from said arm member, so that the upper end of the main body of the shift pedal member is disposed spaced away from an upper end of said arm member;
wherein the pedal is pressable by a foot of a rider of the vehicle, to cause said shift pedal member and said arm member to rotate about the lower end of the main body of the shift pedal member;
the shift assembly further comprising a link member having a lever rotatably connectable to an engine of the vehicle, a plurality of pillow balls, and a link rod having opposing ends, each end having an axially-disposed threaded hole that is threadably engaged with a respective pillow ball, with one of the pillow balls being rotatably connected to an upper end of the arm member, and another one of the pillow balls being rotatably connected with an upper end of the lever.

17. The shift assembly recited in claim 16, wherein the arm member and the link member are adjustable relative to each other by threading the respective pillow balls in their respective threaded holes, so that the link rod and the arm member are essentially perpendicular to each other when the shift pedal member is not rotated.

18. The shift assembly recited in claim 17, wherein the shift pedal member further includes a pedal rotating shaft extending through the lower end of the main body, and about which the main body rotates, the pedal rotating shaft being disposed below where the arm member is mounted on the shift pedal member.

19. The vehicle of claim 1, wherein the arm member is directly mounted to the main body at a location different, in a side view of the vehicle, from a location where the pedal rotating shaft is mounted to the main body.

* * * * *